March 8, 1960     C. UMINA     2,928,041

MICRO-SENSITIVE LEAKAGE AND HEATER CURRENT CHECKER

Filed Nov. 30, 1954     3 Sheets-Sheet 1

INVENTOR.
CARMEL UMINA
BY
HIS ATTORNEY

2,928,041
Patented Mar. 8, 1960

2,928,041

MICRO-SENSITIVE LEAKAGE AND HEATER CURRENT CHECKER

Carmel Umina, Dayton, Ohio

Application November 30, 1954, Serial No. 472,039

9 Claims. (Cl. 324—20)

This invention relates to a vacuum tube tester and more particularly to a device for detecting and measuring normal and abnormal currents passing between various electrodes of the vacuum tube under test.

The device disclosed herein may be used for detecting and measuring leakage currents between the electrodes of vacuum tubes. This device may be incorporated into a regular tube tester or it may be used as an attachment for a tube tester. In several makes of tube testers, a neon light associated with a condenser connected across the vacuum tube may be energized by an alternating current source of voltage used in the tube tester. The voltage of this alternating current must be of a predetermined magnitude before the neon light is energized. A voltage resulting from a leakage current that is too small to energize the neon light may be objectionable and, that being the case, the device disclosed herein is used to amplify and indicate the magnitude of this leakage current. The means for measuring these currents includes a vacuum tube rectifier having the electrodes energized by the A.C. voltage drop caused by the leakage current across the input load supplied to the anode circuit of the tube under test. The output circuit of the rectifier is supplied to a fixed resistance connected to one of the grids of a twin amplifying tube, the plate circuit associated with this one grid being connected to a resistance and to the grid of a 6E5 tube for indicating the leakage current. The voltage supplied to the grid of the amplifier may be varied, so as to counteract the grid bias caused by the leakage current. The voltage may be varied by means of a calibrated optentiometer connected in series with a calibrating potentiometer and a selenium rectifier for supplying D.C. current to said potentiometers. The calibrating potentiometer is used for adjusting the voltage on the calibrated potentiometer. The adjustable contact of the calibrated potentiometer is connected to the zero point on a voltage divider, the voltage in the calibrated potentiometer being in opposition to the voltage across the D.C. load resistor of the rectifier.

The device may also be used for detecting and measuring abnormal currents in the heater element of a vacuum tube. This is accomplished by connecting the primary winding of a heater element of the vacuum tube circuit, the secondary winding of which is connected to the rectifier having its output connected to a grid of an amplifying tube, the output of the amplifying tube indicating abnormal currents, together with means for indicating the magnitude of the abnormal currents.

The twin amplifier developed by me is primarily an improved direct coupled D.C. amplifier, with isolated inputs so each side operates completely independent of the other side. This amplifier is not restricted to twin amplifiers, it can be built with three or four or more isolated amplifiers operating on the same power pack, if design needs require it. This unit can be used as a plug-in unit on any commercial tube tester, thus making the tester a precision unit with high gain checks on heater current and leakage between elements, or it can be built at the factory as a part of commercial tube checker to be sold as a unit.

This invention does not in any way change the method of short checking or quality check on the commercial checker with which it is used; but uses the controls on the checker to obtain a high-gain precision check on heater and shorts between elements, giving microscopic sensitivity to these checks that show up the least fault in tube structure, so the technician operating the tester can analyze the condition of the tube without the present uncertain feeling about the small faults that do not show up on the present testers.

Figure 1:
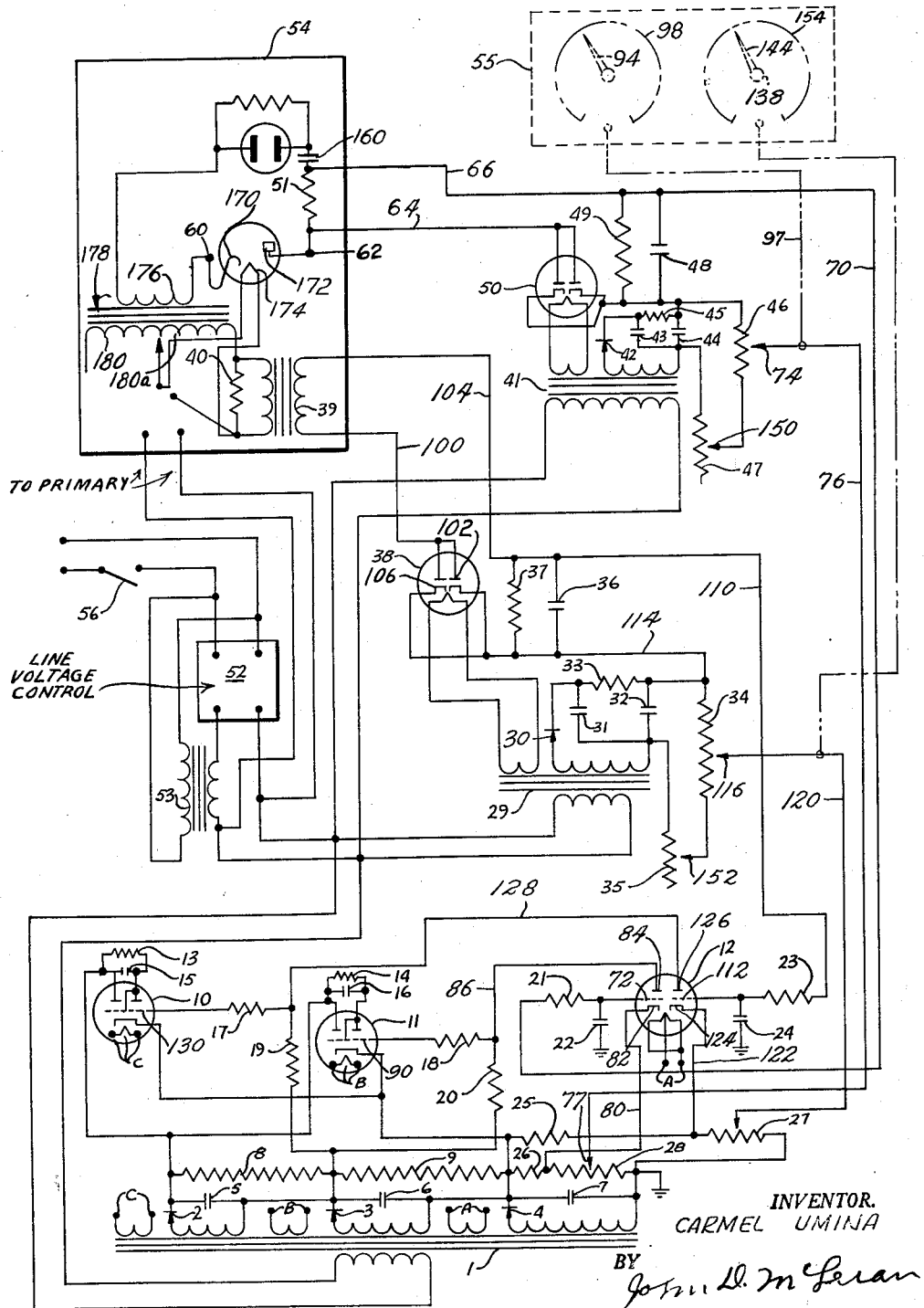
Figure 1 is a general wiring diagram of the complete unit which includes complete twin amplifier, heater compare circuit, leakage compare circuit, a commercially available tube tester, a commercially available A.C. line automatic line voltage control and an auxiliary automatic line voltage control.

The device disclosed herein is either attached to or forms a part of a tube tester illustrated schematically by the rectangle 54 in Figure 1. The electrodes to be tested are connected to the terminals 60 and 62, as described more fully later. In the event the neon light glows, this is a signal to the effect that the leakage current across the electrodes is excessive. If the neon tube is not energized, there may be deleterious leakage currents flowing between the electrodes. These deleterious leakage currents cause a voltage drop across the resistor 51. The leakage current is in the form of alternating current and, that being the case, this alternating current is first rectified.

This is accomplished by connecting one terminal of the resistor 51 through a lead 64 to the anodes of a rectifier 50. A lead 66, connected to the other terminal of the resistor 51, is connected through a load circuit consisting of the condenser 48 and the resistor 49 connected in parallel to the cathodes of the rectifier. A voltage is supplied to the cathodes from the secondary of a transformer 41, the secondary being connected through a selenium rectifier 42. Connected in parallel with the secondary winding and the selenium rectifier 42 is a resistor 45 and a pair of filter condensers 43 and 44.

A calibrated potentiometer 46 and a calibrating potentiometer 47 are connected in parallel with the condenser 44. One terminal of the load circuit, including the resistance 49 and the condenser 48, is connected through a lead 70 to a resistor 21 having one terminal grounded through a condenser 22 and also connected to the grid or control electrode 72 of the amplifier 12. The terminal 74 of the calibrated potentiometer is connected to the zero point 77 of a power supply unit, which will now be described.

This power supply unit includes a voltage divider including the resistors 8, 9, 26, 28, 25 and 27. The voltage dividers or resistors 26 and 28 are connected in parallel with the resistors 25 and 27. The terminal 74 is connected by a shaft 97 to the indicant 94. The resistor 8 is supplied by a rectifier voltage obtained from a secondary winding on the transformer 1. This secondary winding has one terminal connected to a selenium rectifier 2, the output of which is connected to one terminal of the resistor 8. The other terminal of this secondary winding is connected to the other terminal of the resistor 8. The terminals of the secondary winding are connected by a filter condenser 5.

The resistor 9 is energized from another secondary of the transformer 1 having one terminal connected to a selenium rectifier 3 having its output connected to a common terminal of the resistors 8 and 9. The other terminal of this last mentioned winding is connected to the opposite terminal of the resistor 9 and to the output of the selenium rectifier 3 through a filter condenser 6.

The two resistors 26 and 28 and the two resistors 25 and 27 are supplied with a voltage from a third secondary winding having one terminal connected to the selenium rectifier 4 having its output connected to one terminal of the resistor 26 and one terminal of the resistor 25 and also to one terminal of the resistor 9. The other terminal of this third secondary winding is connected to one terminal of the resistor 28 and to one terminal of the resistor 27 and to ground and through a filter condenser 7 to the output of the selenium rectifier 4. The selenium rectifier 4 is connected to ground through the resistors 25 and the potentiometer 27 connected in series.

The secondary windings A, B and C are used in energizing the filaments of the amplifier tube 12 and the 6E5 tubes 11 and 10 respectively.

The load circuit of the rectifier 50, consisting of the resistance 49 and the condenser 48 connected in parallel, is connected through a lead through the resistance 21 to the grid or control electrode 72 of an amplifier 12. A condenser 22 connects the grid to ground. The amplifier tube 12 is a dual amplifier. The cathode 82 associated with the grid 72 is connected by a lead 80 to the terminal between the resistors 26 and 28.

The anode 84, associated with the grid 72, is connected by a lead 86 to a second load circuit including the resistor 20 to the voltage divider and, more specifically, to the terminal between the resistors 8 and 9 and directly to the output of the selenium rectifier 3. This anode 84 is also connected through an isolating resistor 18 to an electrode 90 of the 6E5 tube 11. The cathode of the 6E5, a zero indicating tube 11, is connected to the output of the selenium rectifier 4. The anodes of the 6E5 tube 11 are connected to one terminal of the resistor 8 and directly to the output of the selenium rectifier 2. The two anodes of the tube 11 are connected together by a resistor 14 and a condenser 16, the resistor 14 and the condenser 16 being connected in parallel. The 6E5 tube 11 is used to indicate leakage current between the electrodes.

In order to check or test the current through the heater element of the tube under test, the heater element of this tube is connected to the primary winding of a step-up transformer 39. This step-up transformer may have a ratio of 1 to 150. The secondary winding is connected to a rectifier that has its output so arranged that it can be compared to a standard circuit.

In order to limit the voltage drop across the primary winding of the transformer 39, a resistor 40 is connected in parallel therewith. This resistor 40 limits the maximum voltage drop to any suitable selected voltage, as for example, .1 of one volt. The secondary winding of the transformer 39 has one terminal 100 connected to the anodes 102 of the rectifier tube 38. The other terminal of the secondary winding is connected through a lead 104 through a load circuit including the resistor 37 and the condenser 36 connected in parallel to the cathodes 106 of the rectifier tube 38. One terminal of the load circuit, including the resistor 37 and the condenser 36, is connected through a lead 110 and through a resistor 23 to the control grid 112 of the amplifier tube 12. This control grid is connected to ground through a condenser 24. The other terminal of the load circuit, including the resistor 37 and the condenser 36, is connected by a lead 114 to one terminal of a calibrated potentiometer 34, having its tap 116 connected by a lead 120 to a tap on the potentiometer 27 connected to ground and to one terminal of the resistor 28. The adjustable tap 116 is connected by a shaft 138 to an indicant 144 shown schematically. The calibrated potentiometer 34 is connected to the adjustable tap 152 of the calibrating potentiometer 35, having one terminal connected to one terminal of a secondary winding of the transformer 29. The other terminal of this secondary winding is connected to a selenium rectifier 30, the output of which is connected through a resistor 33 to one terminal of the calibrated potentiometer 34 and to the cathodes 106. A pair of filter condensers 31 and 32 are connected in parallel across the resistor 33 and to one terminal of the calibrating potentiometer 35.

The anode 126 of the amplifier 12 is connected by a lead 128 through a resistor 17 to a control electrode of a 6E5, a zero indicating tube 10. The anode circuits of the 6E5 tube are connected together with a resistor 13 connected in parallel with a condenser 15. The lead 128 is also connected to one terminal of a resistor 19, the other terminal of which is connected to the output of the selenium rectifier 3 and to the junction between the resistor 8 and the resistor 9 of the voltage divider.

Figure 3:
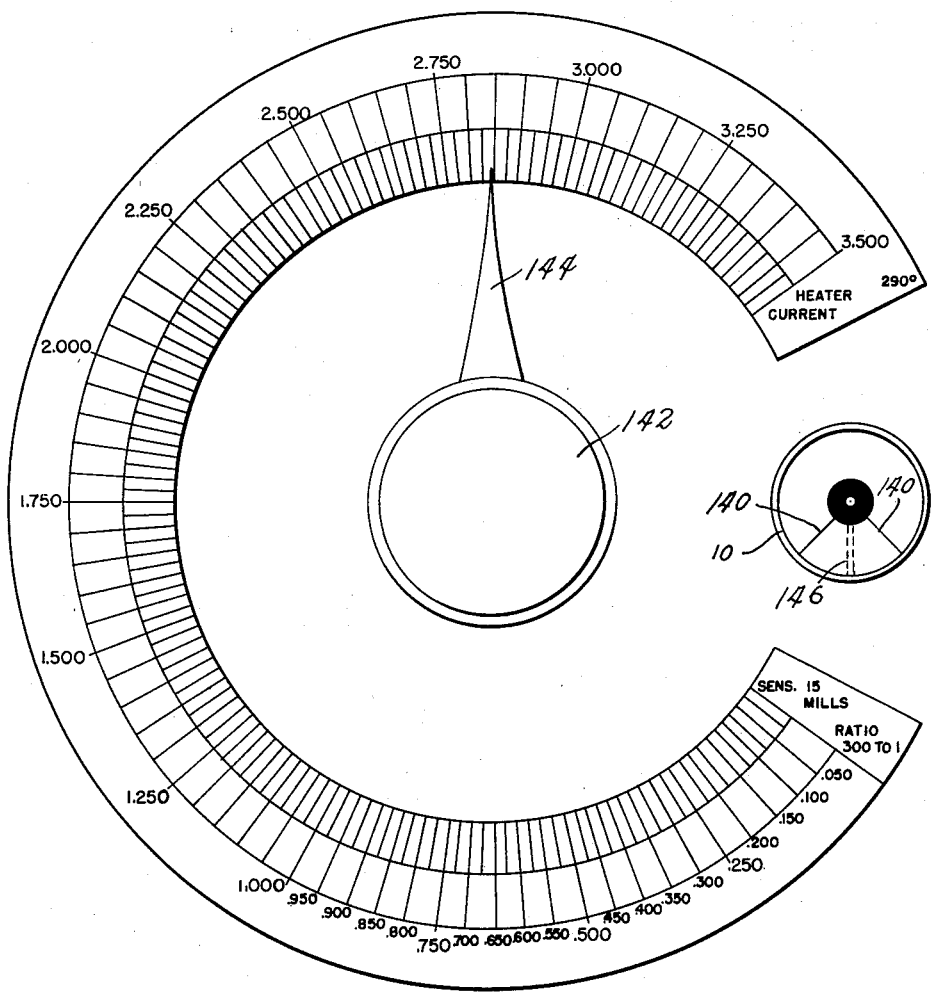
Figure 3 is a drawing showing 6E5 zero indicator for the heater current check circuit and for adjusting the heater current.

The potentiometers 34 and 35 are so arranged that when the proper heater filament current flows through the primary winding of the transformer 39, no signal will be indicated on the 6E5 tube 10, as more fully disclosed in Figure 3. The transformers 1, 29 and 41 have their primary windings connected to a commercial automatic line voltage control 52 shown schematically and associated with the auxiliary automatic line voltage control transformer 53. The commercial automatic line voltage control will regulate the voltage output to plus or minus 1%. The auxiliary automatic line voltage control cuts the voltage down to plus or minus .1% variation. The testing equipment is energized when the switch 56 is closed.

If the tube under test does not have any leakage between any of its electrodes, the tube under test in the tube tester, when energized by A.C. voltage, will cause the voltage or current to be rectified. When it is rectified, the condenser 160 in series with the neon tube will block the flow of the direct current, so as to eliminate any flow of direct current through the neon tube. The tube under test, including the cathode 170, the anode or plate 172 and the heater element or filament 174, is mounted in a conventional tube tester represented by the rectangle 54. The secondary winding 176 of a transformer 178 in the tube tester is used to supply a voltage across the terminals of the cathode and the anode of the tube under test. The primary winding 180 of this transformer 178 is energized from the line voltage control 52. A portion 180a of the primary is used as an auto transformer winding to energize the heater element 174.

In the event there is leakage between any of the electrodes, the particular electrodes being selected by the tube tester, then an A.C. current will flow through the neon light, but the voltage built up across the terminals of the neon tube may be insufficient to cause a flash or cause the neon tube to glow. If it glows, then it is a signal that the tube is defective.

Mode of operation

The electrodes of the tube to be tested are connected through suitable leads to the terminals or contacts 60 and 62. If there is a leakage current between the electrodes, there will be a voltage drop across the resistor 51. The voltage drop across this resistor 51 is supplied by leads 64 and 66 to the rectifier 50. One terminal of the resistor 49 and condenser 48 forming a load of the rectifier 50 is connected by a lead 70 through the resistor 21 to the grid 72 of the amplifier 12. The voltage drop across the resistor 49 is used to bias the grid 72. The variable terminal or contact 74 of the variable resistance of the potentiometer 46 is connected by a lead 76 to a variable contact 77 of the resistor 28 which has a fixed contact thereon connected by a lead 80 to the cathode 82 of the amplifier 12. The anode or plate 84 of the amplifier tube 12 is connected by a lead 86 through a resistance 18 to the grid 90 of the 6E5 tube 11. As is well known to those skilled in the art, the leakage indicator 6E5 tube 11, shown in Figure 2, will then either open up or completely close, depending upon whether a positive or a negative voltage is generated. If it is positive, it opens the curtains so as to show a wider beam. If it is negative, it will close the curtains or cause the curtians to overlap, so as to eliminate the beam.

Figure 2:
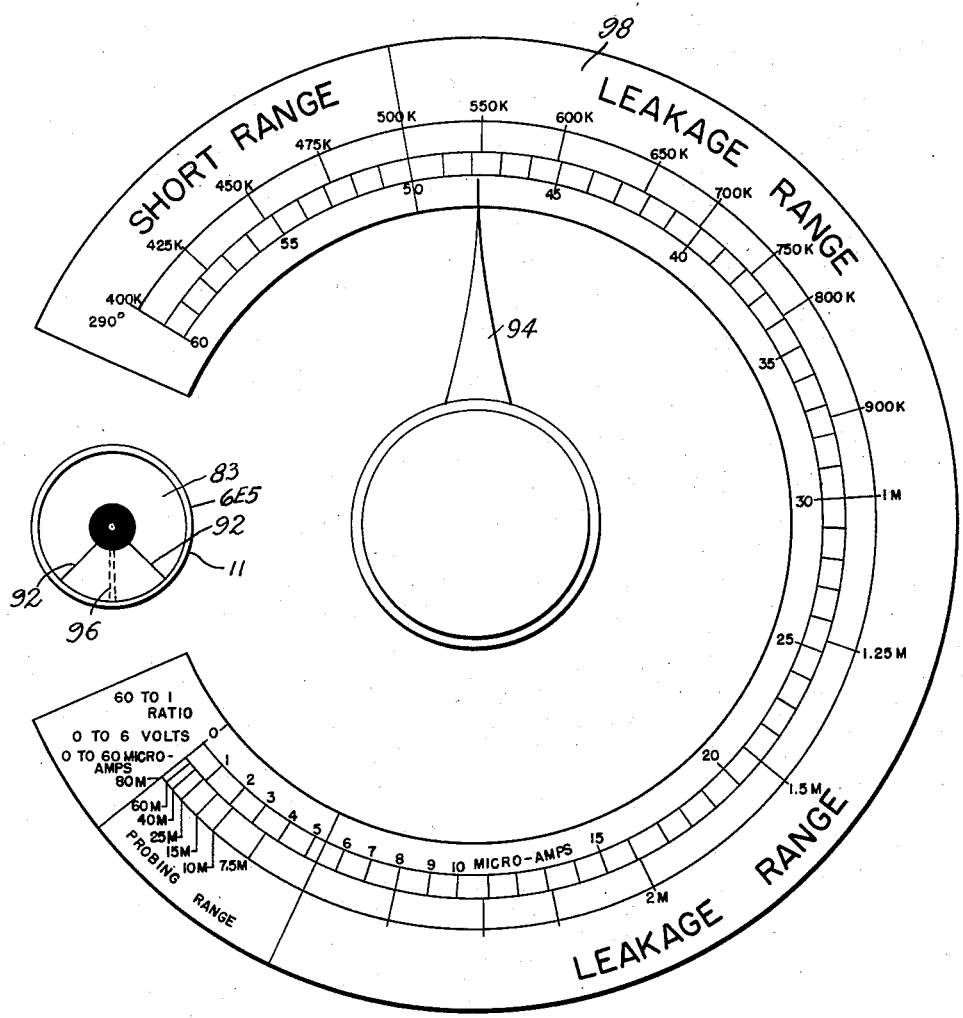
Figure 2 is a drawing showing 6E5 zero indicator for the leakage check circuit and a device for adjusting leakage currents.

Referring to Figure 2, if the curtain or screen 83 of this 6E5 tube is open, as indicated by the lines 92, it indicates that there is a leakage current, the magnitude of which may be measured by adjusting the adjustable contact or terminal 74 on the potentiometer 46. When the indicant 94 is adjusted to the position so that the screen or curtain 83 is in the form of a beam, indicated by dotted lines 96, the leakage current may then be read on the dial 98. In reality, what is read on this scale is a counter current that is equal in magnitude, but in voltage opposition to the leakage current. After testing one pair of electrodes, the contacts 60 and 62 are then shifted to another pair of electrodes, this continuing until all pairs of electrodes have been tested.

There may also be a short circuit between heater elements and one or more electrodes. If there is an intermittent circuit, it may not show up in the ordinary tube tester. In some cases, the short does not become apparent until the tube is heated up and has been in operation for a period of time. In testing a tube, it would be futile to let the tube remain in the tube tester for half an hour, an hour, or two or three hours, as the case may be, in order to determine whether or not there is an intermittent short. In the event there is an intermittent short, the device disclosed herein will detect such a short within a period of thirty (30) seconds. It seems that when there is an intermittent short, the leakage current may be very small at first and, as the tube remains in operation, this leakage current increases. If it operates long enough, it would show up on the conventional tube tester. The device disclosed herein may be used to detect a very small leakage caused by an intermittent short circuit. The mode of operation of the device in this respect will now be described.

The heater element may be short-circuited or open-circuited, so as to either have an excessive or an insufficient current flow. This may also be tested. The heater element of the tube is connected in series with the primary winding of the transformer 39. This is a step-up transformer, the secondary of which is connected by a lead 100 to one set of electrodes 102 of the rectifier 38 and the other terminal of the secondary winding is connected by a lead 104 through the resistor 37 to the cathodes 106 of the rectifier 38. The voltage drop across the load control resistor 37 is utilized to energize the right hand side of the amplifier 12. The plate 126 of this tube 12 is connected by a lead 128 through the resistor 17 to the grid 130 of the 6E5 tube 10. This 6E5 tube 10 has been shown in Figure 3. When there is either too large a current or too small a current through the heater element, the curtain members 140 are either too widely open, as shown in Figure 3, or they are completely closed. By adjusting the variable contact 116 along the potentiometer 34 by turning the knob 142, the indicant 144 will indicate the heater current. By adjusting the indicant 144 so that there is merely a beam, indicated by the dotted lines 146, the magnitude of the heater current is then indicated.

In the event this current is beyond the maximum tolerable current specified by the manufacturer for the heater element, then the tube is defective. By this arrangement, if there is an intermittent short, there will be a flickering signal generated by the indicator. If there is a partial open, the current will be too low; if there is a partial short, it will be too high; and if it is completely open, there will be no current. All of these conditions are indicated by the operation of the indicating tube 10.

Before utilizing this tube tester, the variable contact 150 is adjusted along the resistance of the potentiometer 47 and the indicant 94 turned to zero position to form a beam 96 on the 6E5 tube 11. This is for the purpose of calibration. Likewise, the adjustable contact 152 is used in calibrating the heater element circuit. Again, by turning the indicant 144 to the zero position, for a tube with a normal heater element therein, the curtain and the 6E5 tube 10 may then be adjusted so as to form a beam by moving the variable contact 152 along the resistor or potentiometer 35. When the instrument has been calibrated, it is ready for use.

The graduated dials 98 and 154 may be mounted in a panel 55 shown schematically in Figure 1.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having described my invention I claim:

1. A device for detecting and measuring leakage currents between electrodes of vacuum tubes, the combination of a neon light and a condenser connected across the vacuum tube when energized by alternating current source of voltage, the neon light glowing when heavy leakage alternating currents flow between the electrodes connected thereto, with means for indicating leakage currents insufficient in magnitude to energize the neon light, said means including a vacuum tube rectifier having electrodes energized by the A.C. voltage drop across the input load in the anode circuit of the tube under test, said rectifier having its output connected to a load circuit including a fixed resistance connected to one grid of a twin amplifying tube, the plate circuit associated with the one grid being connected to a load circuit and to the grid of a 6E5 tube for indicating leakage current, and means for varying the voltage supplied to the grid of the amplifier so as to counteract the grid bias caused by the leakage current, said last mentioned means including a calibrated potentiometer connected in series with a calibrating potentiometer, a selenium rectifier for supplying D.C. current to said potentiometer, the calibrating potentiometer being used for adjusting the voltage on the calibrated potentiometer, said calibrated potentiometer being connected in series with the load resistor of the rectifier, the adjustable contact of the calibrated potentiometer being connected to the arm of a zero point on a voltage divider, said voltage divider having one terminal connected to the cathode of the input amplifier and the other terminal grounded, the voltage in the calibrated potentiometer being in voltage opposition to the voltage across the D.C. load resistor of the rectifier.

2. A device for detecting and measuring leakage currents between electrodes of vacuum tubes according to claim 1, including means having a calibrated scale and an indicant and an indicator connected to the calibrated potentiometer for measuring the magnitude of the leakage current.

3. A device for detecting and measuring abnormal currents in the heater element of a vacuum tube, the combination of a transformer having a primary winding connected in series with the heater element of the vacuum tube and the secondary winding connected to electrodes of a rectifier, said rectifier having its output connected to a load circuit including a fixed resistance connected to one grid of a twin amplifying tube, the plate circuit associated with the one grid being connected to a load circuit and to a grid of the 6E5 tube for indicating abnormal currents, and means for impressing voltage upon the output of the vacuum tube rectifier, means for varying the voltage supplied to the grid of the twin amplifier so as to counteract the grid bias caused by the abnormal current, said last mentioned means including a calibrated adjustable linear control resistor.

4. A device for detecting and measuring abnormal currents according to claim 3, wherein short-circuits are indicated by a flicker on the 6E5 tube, said device including a calibrated scale, an indicant and an indicator connected to the calibrated adjustable linear control resistor, the indicator flickering in response to variable leakage current.

5. A device according to claim 3 including means for measuring the magnitude of the abnormal currents, said last mentioned means including a calibrated scale, and an indicant adjustable in unison with the adjustable linear control resistor.

6. A method of detecting and measuring leakage currents between the electrodes of a vacuum tube mounted in a conventional tube tester having a neon light circuit for causing the neon light to become energized when excessive leakage currents flow between the electrodes, the neon light circuit including a resistor and a condenser blocking the flow of direct currents, said method including the steps of energizing the vacuum tube under test, impressing an alternating signal upon at least one of the electrodes of the tube under test, rectifying the current flowing through said resistor, amplifying the leakage current output of the rectifier, energizing the control grid of a 6E5 tube by the amplified leakage current to indicate whether or not there are leakage currents flowing between the electrodes, impressing an opposing current upon the 6E5 control grid to neutralize the leakage current, and indicating the magnitude of the opposing current to thereby indicate the magnitude of the leakage current.

7. A method of detecting and measuring leakage currents between the electrodes of a vacuum tube mounted in a conventional tube tester having a neon light circuit for causing the neon light to become energized when excessive leakage currents flow between the electrodes, the neon light circuit including a resistor and a condenser blocking the flow of direct currents, said method including the steps of rectifying the leakage current flowing through the resistor, amplifying said rectified leakage current, supplying the amplified leakage current to the control electrode of a 6E5 tube, and supplying a current from the rectifier to the amplifier for neutralizing the rectified leakage current.

8. A method of detecting leakage currents between the electrodes of a vacuum tube according to claim 6, wherein the method includes the step of measuring the current used in neutralizing the rectified leakage current.

9. A method of detecting and measuring leakage currents between the electrodes of a vacuum tube mounted in a conventional tube tester having a neon light circuit for causing the neon light to become energized when excessive leakage currents flow between the electrodes, the neon light circuit including a resistor and a condenser blocking the flow of direct currents, said method including the steps of energizing the tube under test, impressing an alternating signal upon at least one of the electrodes of the tube under test, rectifying the leakage current flowing through the resistor, passing the rectified leakage current through a calibrated potentiometer, supplying the rectified leakage current to an amplifier, adjusting the calibrated potentiometer to neutralize the leakage current, supplying the output of the amplifier to the grid of a 6E5 tube, and measuring the adjustment of the calibrated potentiometer to thereby indicate the magnitude and the polarity of the leakage current passing through the resistor.

References Cited in the file of this patent

UNITED STATES PATENTS

| | | |
|---|---|---|
| 1,952,533 | Carpenter | Mar. 27, 1934 |
| 2,172,897 | Wenger | Sept. 12, 1939 |
| 2,172,953 | Buchard | Sept. 12, 1939 |
| 2,190,962 | Wenger | Feb. 20, 1940 |
| 2,235,173 | Shepard | Mar. 18, 1941 |
| 2,699,528 | Periale | Jan. 11, 1955 |
| 2,760,151 | Andrews et al. | Aug. 21, 1956 |